(12) United States Patent
Gan

(10) Patent No.: US 8,103,789 B1
(45) Date of Patent: Jan. 24, 2012

(54) METHOD AND APPARATUS FOR COMPUTING A BACKUP PATH USING FATE SHARING INFORMATION

(75) Inventor: Der-Hwa Gan, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1781 days.

(21) Appl. No.: 09/795,454

(22) Filed: Mar. 1, 2001

(51) Int. Cl.
*G06F 15/173* (2006.01)
(52) U.S. Cl. ............. 709/238; 709/239; 714/2; 370/242
(58) Field of Classification Search .................. 709/231, 709/243, 238–242; 370/216, 238–256, 237, 370/238.1, 351
See application file for complete search history.

(56) References Cited

U.S. PATENT DOCUMENTS

| | | | | | |
|---|---|---|---|---|---|
| 5,317,566 | A | * | 5/1994 | Joshi | 370/238 |
| 5,754,543 | A | * | 5/1998 | Seid | 370/351 |
| 5,850,505 | A | * | 12/1998 | Grover et al. | 714/4 |
| 5,872,773 | A | * | 2/1999 | Katzela et al. | 370/256 |
| 5,933,425 | A | * | 8/1999 | Iwata | 370/351 |
| 6,084,858 | A | * | 7/2000 | Matthews et al. | 370/238 |
| 6,094,687 | A | * | 7/2000 | Drake et al. | 709/241 |
| 6,098,107 | A | * | 8/2000 | Narvaez-Guarnieri et al. | 709/239 |
| 6,141,318 | A | * | 10/2000 | Miyao | 370/217 |
| 6,141,319 | A | * | 10/2000 | Dighe et al. | 370/218 |
| 6,192,043 | B1 | * | 2/2001 | Rochberger | 370/351 |
| 6,256,295 | B1 | * | 7/2001 | Callon | 370/254 |
| 6,256,309 | B1 | * | 7/2001 | Daley et al. | 370/395.43 |
| 6,498,778 | B1 | * | 12/2002 | Cwilich et al. | 370/216 |
| 6,507,561 | B1 | * | 1/2003 | Baniewicz et al. | 370/216 |
| 6,542,934 | B1 | * | 4/2003 | Bader et al. | 709/239 |
| 6,584,075 | B1 | * | 6/2003 | Gupta et al. | 370/256 |
| 6,633,544 | B1 | * | 10/2003 | Rexford et al. | 370/238 |
| 6,697,333 | B1 | * | 2/2004 | Bawa et al. | 370/238 |

\* cited by examiner

*Primary Examiner* — Abdullahi Salad
(74) *Attorney, Agent, or Firm* — Harrity & Harrity, LLP

(57) ABSTRACT

To address shortcomings in the prior art, the invention uses fate sharing information to compute backup paths. Fate sharing information relates groups of nodes or links according to common characteristics, attributes, or shared resources (e.g., a shared power supply, close proximity, same physical link). In one embodiment, fate-sharing information includes costs associated with groups of nodes or links. When a primary path contains a link or node that is in a fate-sharing group, the other links or nodes in the fate-sharing group are assigned the cost associated with that fate-sharing group. The node computing the backup path takes into account the assigned cost together with other node and link costs. Discovering the existence of the relationships and assigning costs to the groups may be done manually or automatically.

16 Claims, 8 Drawing Sheets

| Link/node group | Cost |
| --- | --- |
| Nodes B, D | 500 |
| Link A-B, A-E | 400 |
| Link D-C, E-C | 600 |
| ... | ... |

Fig. 3

METHOD AND APPARATUS FOR COMPUTING A BACKUP PATH USING FATE SHARING INFORMATION

BACKGROUND OF THE INVENTION

In today's computer networks, clients and servers are connected through a mesh of interconnected nodes. These nodes may include routers or switches, which forward data packets to neighboring nodes until the data packets reach their destinations.

Nodes may use different techniques for determining the neighboring nodes to which data is forwarded. One technique involves a node computing a complete or partial path through the network. The node may compute the path using an algorithm, such as Shortest Path First, and/or using external information, such as traffic engineering information or user configured information. Such a computation usually involves assigning costs to links and nodes in the network and computing the least cost path through the network.

In some cases, a node may compute more than one path. In such a case, one path is used as the primary path and the other(s) as backup(s). If, for whatever reason, the primary path becomes unusable (e.g., a link or node in the primary path malfunctions or becomes incapacitated), the node switches over to one of the backup paths. Having a precomputed backup path reduces the time needed to establish a new path.

The backup path(s) is useless, however, if it goes down at the same time and for the same reason as the primary path. This may happen when the primary and backup paths contain links or nodes that share common characteristics, attributes, or resources. For example, the primary path and backup path may contain lines that share the same trench. A cut in the primary path line is likely to cut the backup path line. Or, the primary path and backup path contain nodes that share the same power supply. If the power supply fails, neither path is usable.

SUMMARY OF THE INVENTION

The invention addresses these shortcomings and other shortcomings in the prior art. The scope of the invention is defined by the appended claims.

In one aspect of the invention, fate-sharing information is stored in memory. This may be done, for example, by determining a relationship between a group of links or nodes in a network, assigning a cost corresponding to the link or node group based on the relationship, and storing the cost and associated link or node group in memory.

In another aspect of the invention, fate-sharing information is used to compute a backup path. This may be done, for example, by accessing cost information associated with a link or node group when a link or node from that group is used in the primary path, assigning the accessed cost to the links or nodes in the group that are not in the primary path, and computing a least cost path based, at least in part, on the assigned cost information.

BRIEF DESCRIPTION OF THE DRAWINGS

FIG. 3 shows an example of how information may be stored in the fate-sharing database;

DETAILED DESCRIPTION

To address shortcomings in the prior art, the invention uses fate sharing information to compute backup paths. Fate sharing information relates groups of nodes or links according to common characteristics, attributes, or shared resources (e.g., a shared power supply, close proximity, same physical link). In one embodiment, fate-sharing information includes costs associated with groups of nodes or links. When a primary path contains a link or node that is in a fate-sharing group, the other links or nodes in the fate-sharing group are assigned the cost associated with that fate-sharing group. The node computing the backup path takes into account the assigned cost together with other node and link costs. Discovering the existence of the relationships and assigning costs to the groups may be done manually or automatically.

The following description of the invention refers to the accompanying drawings. The same reference numbers and different drawings identify the same or similar elements. Also, the following detailed description does not limit the invention. Instead, the scope of the invention is defined by the appended claims and equivalents.

Figure 1:
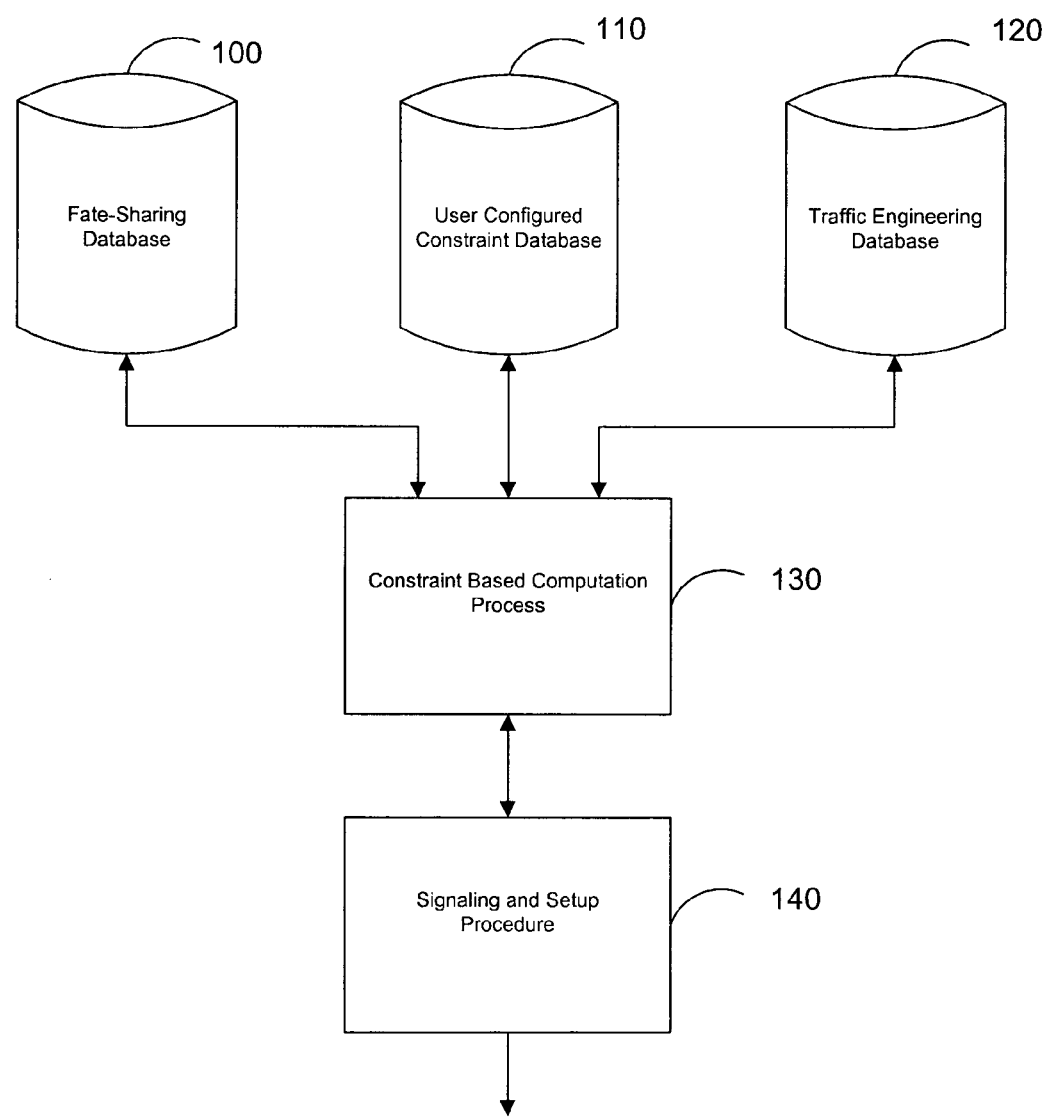
FIG. 1 shows a block diagram of a system including a fate-sharing database, according to one embodiment of the invention.

FIG. 1 shows a block diagram of a system including a fate-sharing database, according to one embodiment of the invention. The system shown in FIG. 1 includes fate-sharing database 100, user configured constraint database 110, traffic engineering database 120, constraint based computation process 130, and signaling and setup process 140. This system may be used as part of a network node (such as a router or switch) or as a separate stand-alone system. For example, the system may be incorporated into node A of the network shown in FIG. 2A, discussed in greater detail below.

Databases 100, 110, and 120 preferably store, on a computer-readable media, constraint and/or cost information associated with links and nodes in a network. While FIG. 1 shows these databases as separate databases, they may be combined or maintained separately. Additionally, in other embodiments (not shown), fewer or more databases containing constraint and/or cost information may be used.

Database 100 stores fate-sharing information. As mentioned above, fate-sharing information relates groups of nodes or links according to common characteristics, attributes, or shared resources.

An example of how information may be stored in fate sharing database 100 is shown in FIG. 3. FIG. 3 shows a database record containing three entries corresponding to links and nodes in the network shown in FIG. 2A. The first entry indicates that the group of nodes B and D are associated with a cost 500. The second entry indicates that the group of links A-B and A-E are associated with a cost 400. The third entry indicates that the group of links D-C and E-C are associated with a cost 600. Each entry indicates that the nodes or links in each group are related. Of course, more or fewer entries can be included in database 100. Further, in alternative embodiments, different fields may be stored in database 100 to reflect the relationships between groups of links and nodes.

Figure 4:
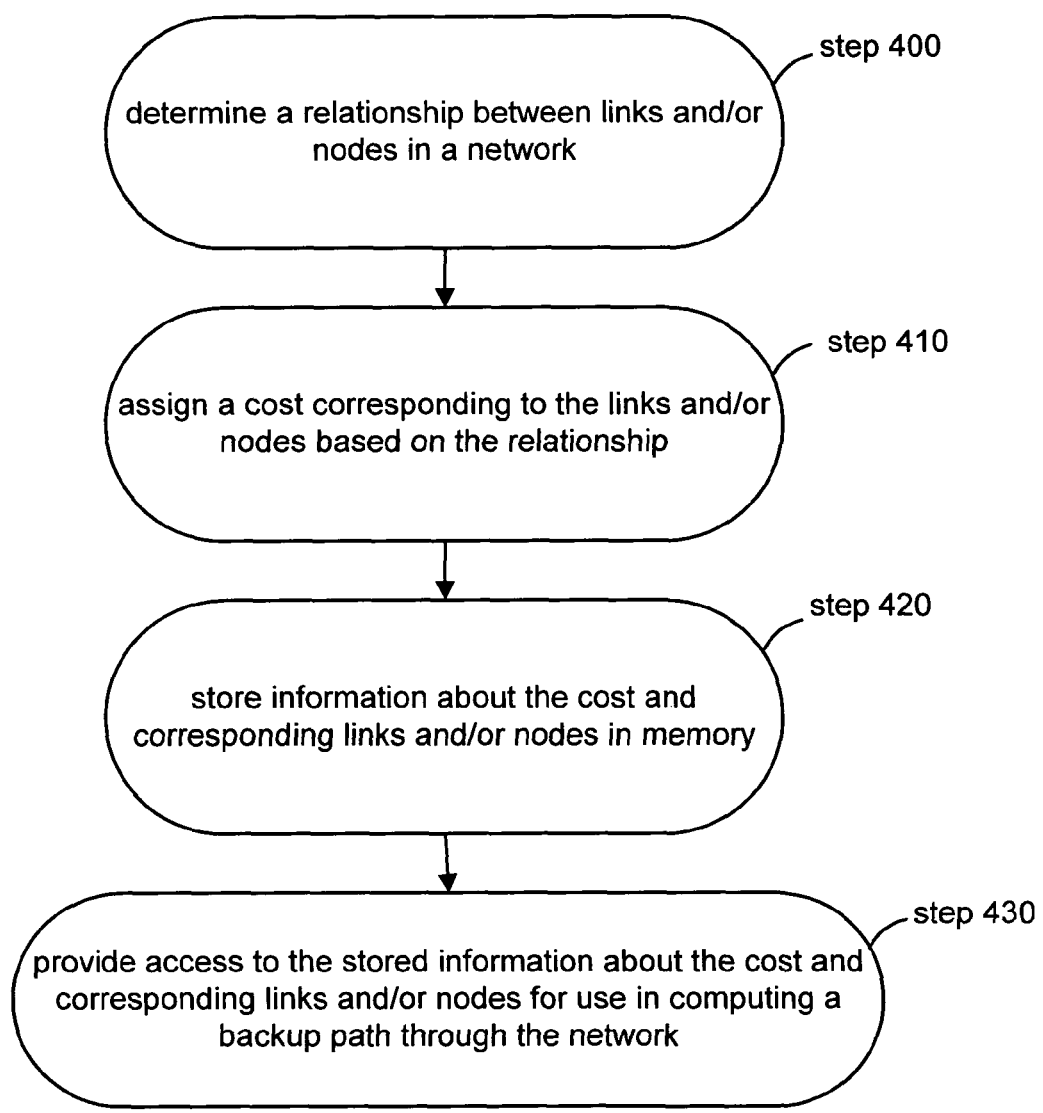
FIG. 4 shows a flow diagram of a method for establishing a fate-sharing database.

A flowchart showing a process, by which the fate-sharing database is established, according to one embodiment of the invention, is shown in FIG. 4. A relationship is determined between a group of links and/or nodes in a network (step 400).

Examples of relationships are nodes or links that share a power supply, are in close proximity, or share the same physical link or node. In a preferred embodiment, the relationship is such that the group of nodes or links may become inoperable when a single event occurs. Determining the existence of the relationships may be done manually or automatically by devices in the network.

A cost corresponding to the link and/or node groups is assigned (step 410). In one embodiment, the cost values may be assigned according to the likelihood that failure to one node or link will result in failure to the other(s) in the group. For example, the higher the likelihood that failure to one node will result in failure to the other nodes in the group, the higher the assigned cost value.

Information about the cost and corresponding link and/or node groups is stored in memory (step 420). Access is provided to the stored information for use in computing a backup path through the network (step 430).

Returning back to the block diagram of the system shown in FIG. 1, user configured constraint database 110 preferably contains constraints relating to the routing or forwarding of data in a network. Such constraints may take the form of bandwidth requirements, hop-count limitations, priorities, etc. determined costs set by the network administrator indicating how network resources may be used.

Traffic engineering database 120 preferably contains a topology map of all nodes/links in the network, as well as costs for using nodes and links in the network. These costs may be set in a manner that determines how traffic flows through the network (e.g., which paths are used).

Constraint based computation process 130 can access constraint and cost information from fate sharing database 100, user configured constraint database 110, and traffic engineering database 120. Constraint based computation process 130 preferably computes paths based on this constraint and cost information according to a constraint shortest path first algorithm. In other embodiments, other algorithms may be also be used.

Signaling and setup process 140 receives path information from constraint based computation process 130 and establishes primary and backup paths. In one embodiment, the primary path is the least cost path and the backup paths are determined as the next least cost paths. Process 140 selects either the primary or, if unavailable, the next computed backup path. When the primary path becomes unusable or inoperable, signaling and setup process 140 switches over to the backup path. Process 140 outputs the selected path, preferably for use in forwarding data (e.g., packets) along the selected path. In one embodiment, process 140 outputs the selected path to other processes and/or modules responsible for controlling the forwarding of data packets along the selected path.

In one embodiment, process 130 and process 140 comprise software instructions executed on one or more processors. In alternative embodiments, process 130 and process 140 may be functions implemented in hardware, such as circuits or ASICs, or a combination of hardware and software. Further, while process 130 and process 140 are shown as separate processes, some or all of their functionality may be combined into a single process.

FIGS. 2A-2D illustrate a simple network in which the invention may be used. The network comprises five nodes (A, B, C, D, E) and six links (A-B, A-D, A-E, D-C, B-C, E-C). The nodes may be routers or switches or other networking devices that compute paths through a network. While the invention is described in connection with a simple network, the principles of the invention apply to more complex networks containing more nodes and/or links as well as simpler networks containing fewer nodes and/or links.

Figure 2A:
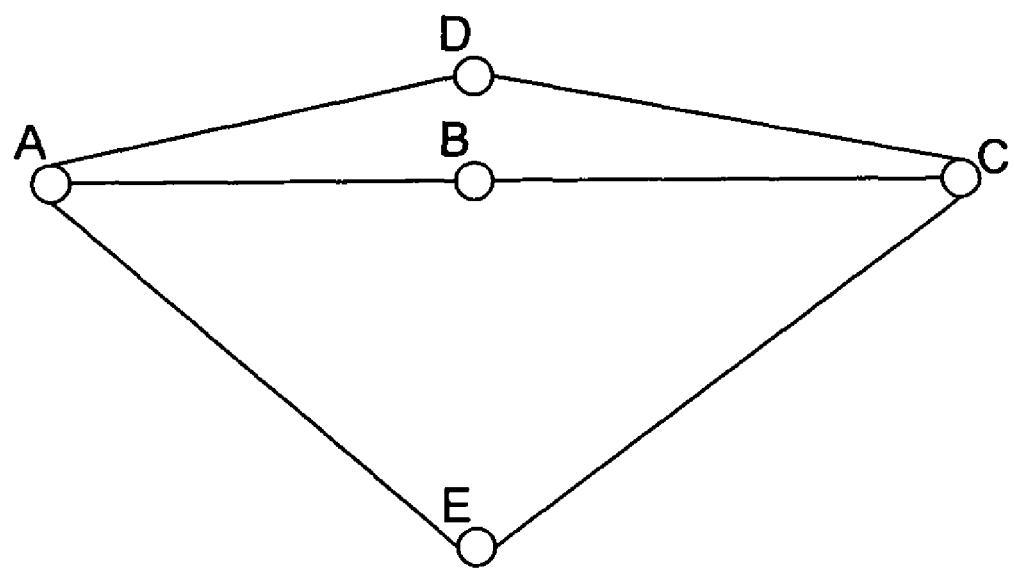
FIGS. 2A-2D illustrate a simple network in which the invention may be used.
Figure 2B:
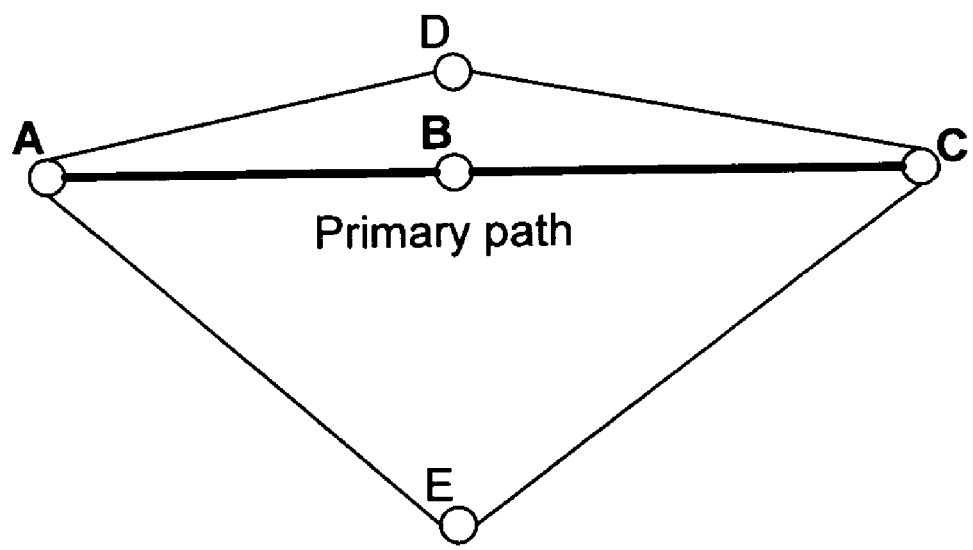
Figure 2C:
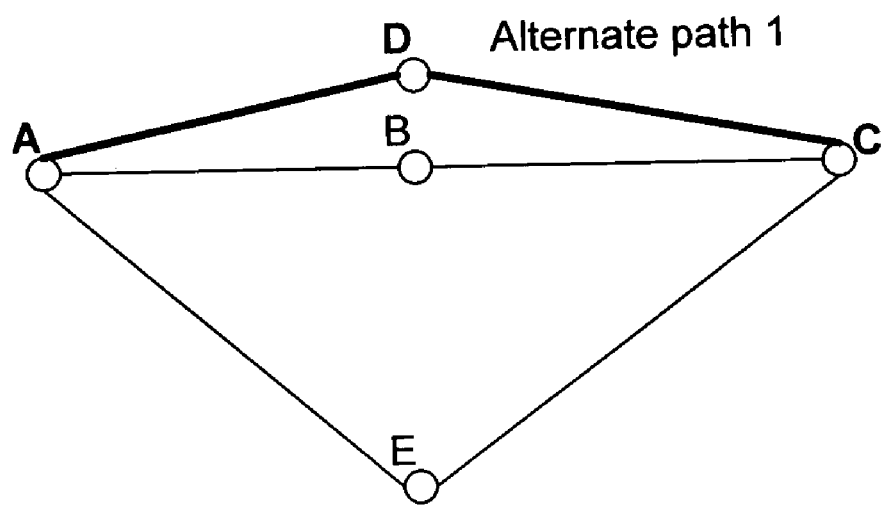
Figure 2D:
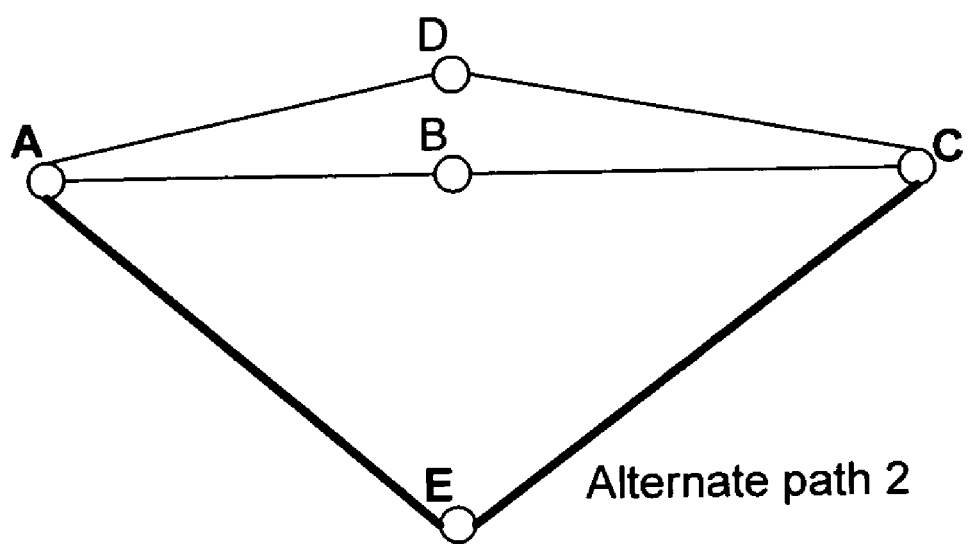

In the network shown in FIG. 2A, node A computes a path to node C. For example, node A may determine that path A-B-C is the least cost path and designate that path to be the primary path, as shown in FIG. 2B. Node A may then compute the costs of alternate paths and select the next least cost path to be the backup path to node C. One alternative path is path A-D-C (as shown in FIG. 2C) and another alternative path is path A-E-C (as shown in FIG. 2D).

Figure 5:
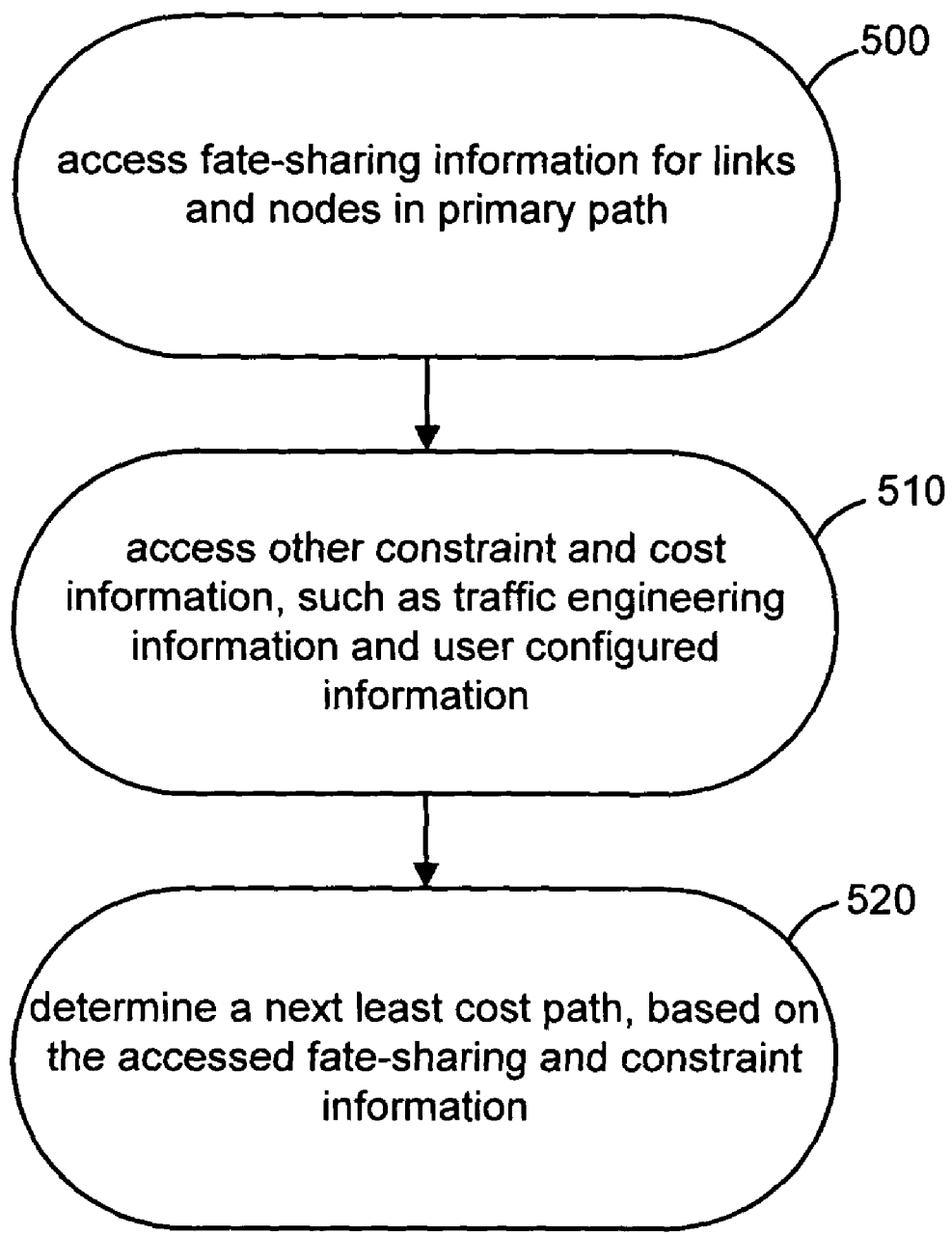
FIG. 5 shows a flow diagram of a method using the fate-sharing database.

The process for computing the backup path using fate sharing information is shown in connection with FIG. 5. These steps are illustrated by example with reference to the network shown in FIGS. 2C-2D.

The computing node accesses fate sharing information for links and nodes in groups associated with links and nodes in the primary path (step 500 shown in FIG. 5). Referring to FIGS. 2C-2D, node A takes into account fate sharing information relevant to primary path A-B-C and the alternate paths in determining which alternative path is the appropriate backup path. For example, applying the fate sharing information shown in FIG. 3, a cost of 500 corresponding to the first entry is assigned to node D since node B of the first group is in the primary path; and a cost of 400 corresponding to the second entry is assigned to link A-E since link A-B of the second group is also in the primary path. The cost in the third entry, however, is not used since neither link in the third group is used in the primary path.

The computing node accesses other constraint and cost information (step 510). This information may include traffic engineering information and user configured information. The computing node determines a next least cost path based on the accessed information (step 520). In the case of the alternate paths shown in FIGS. 2C-2D, node A determines which of these alternate paths is the next least cost path by adding the assigned fate-sharing costs to the other costs for each alternate path.

As shown by the example discussed in connection with FIGS. 2A-2D and 3, the backup path that is ultimately selected may still contain links or nodes that are related to link or nodes in the primary path. This may occur, for example, when all of the alternate paths contain links or nodes associated with fate sharing information. By taking fate-sharing information into consideration, however, the chances that both the primary path and backup path will be taken down by the same event is reduced.

The foregoing description of preferred embodiments of the present invention provide illustration and description, but is not intended to be exhausted or to limit the invention to the precise form disclosed. Modifications and variations are possible in light of the above teachings or may be acquired from practice of the invention.

The scope of the invention is defined by the claims and their equivalents.

What is claimed is:

1. A method comprising:
   determining a relationship between at least two links or at least two nodes in a network, where the relationship is determined based on the at least two links or the at least two nodes being associated with a common resource, where the relationship is based on a common characteristic or a common attribute that is indicative of the at least two links or the at least two nodes becoming inoperable when a single event related to the common resource occurs;
   assigning a cost associated with the at least two links or the at least two nodes based on the relationship and a likelihood that a failure of one of the at least two links or one of the at least two nodes, resulting from a failure of the common resource, will result in a failure of another one of the at least two links or the other at least two nodes; and determining, based on the assigned cost, a primary path and a backup path through the network, the primary path including the one of the at least two links or the one of the at least two nodes and the backup path including the other one of the at least two links or the other one of the at least two nodes.

2. The method according to claim 1, further comprising:
storing the assigned cost in a memory; and
providing access to the stored cost for use in computing the backup path through the network.

3. The method according to claim 1, where the relationship is determined further based on the at least two links or the at least two nodes sharing the common characteristic or the common attribute.

4. The method of claim 1, further comprising:
accessing information indicative of a likelihood of a failure of a network component in the primary path, resulting from a failure of a network resource, to result in a failure of another network component in the backup path;
identifying, based on the accessed information, the relationship;
assigning a cost to the other network component based on the relationship; and
determining a secondary path in the network different than the primary path, based on the cost assigned to the other network component.

5. The method according to claim 4, where the relationship involves the network component and the other network component being associated with the common characteristic or attribute.

6. The method according to claim 4, where determining the secondary path includes:
determining the secondary path based on traffic engineering information and user configured information.

7. The method of claim 4, where the network resource comprises a power supply that supplies power to the network component and the other network component, and
where identifying the relationship, further comprises:
determining, based on the accessed information, that the network component and the other network component utilize the power supply.

8. The method of claim 4, where the network resource includes the one of the at least two links, and
where identifying the relationship, further comprises:
determining, based on the accessed information, that the network component and the other network component share the one of the at least two links.

9. The method of claim 4, where the network resource includes the one of the at least two nodes, and
where identifying the relationship, further comprises:
determining, based on the accessed information, that the network component and the other network component share the one of the at least two nodes.

10. The method of claim 1, where determining the relationship between the at least two links or the at least two nodes includes:
determining that the at least two links or the at least two nodes share the common resource.

11. The method of claim 1, where the common resource comprises a power supply, and
where determining the relationship between the at least two links or the at least two nodes includes:
determining that a failure of the power supply shared by the at least two links or the at least two nodes will result in the failure of the one of the at least two links or the at least two nodes and the failure of the other one of the at least two links or the at least two nodes.

12. The method of claim 1, where determining the relationship between the at least two links or the at least two nodes includes:
identifying a physical link shared by the at least two links or a physical node shared by the at least two nodes.

13. A system for computing a backup path to a primary path through a network, the system comprising:
a network device comprising:
a database for storing a plurality of identifiers, each of the plurality of identifiers corresponding to:
a group of links or nodes that have a relationship to each other, where the relationship is based on a resource associated with the group of links or nodes, and
a cost associated with the group of related links or nodes, the cost being based on the relationship and a likelihood that an inoperability of one of the group of related links or nodes, resulting from an inoperability of the resource, will result in an inoperability of another one of the group of related links or nodes;
at least a first process to:
identify the relationship based on a characteristic or an attribute associated with the group of related links or nodes that is indicative of each of the group of related links or nodes becoming inoperable when a single event occurs, where the inoperability of the resource is associated with the occurrence of the single event,
compute a least cost path using information from the database related to the primary path,
select the computed least cost path to be a backup path, and
switch over to the backup path when the primary path becomes inoperable.

14. The system of claim 13, where the resource comprises a common power supply.

15. The system of claim 13, where the resource comprises a single physical link or a single physical node.

16. The system of claim 13, where the at least the first process is further to:
compute the least cost path based on traffic engineering information and user configured information.

* * * * *